No. 644,798. Patented Mar. 6, 1900.
A. J. FRITH.
INTERNAL COMBUSTION ENGINE.
(Application filed Oct. 23, 1899.)
(No Model.)
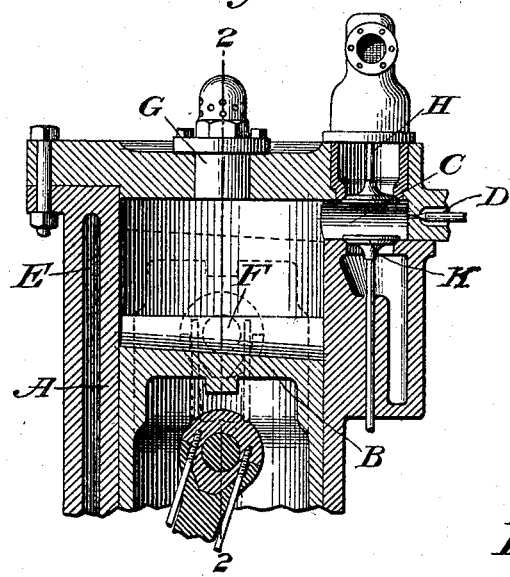
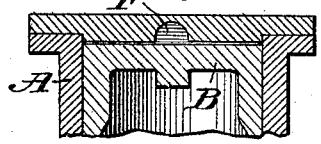
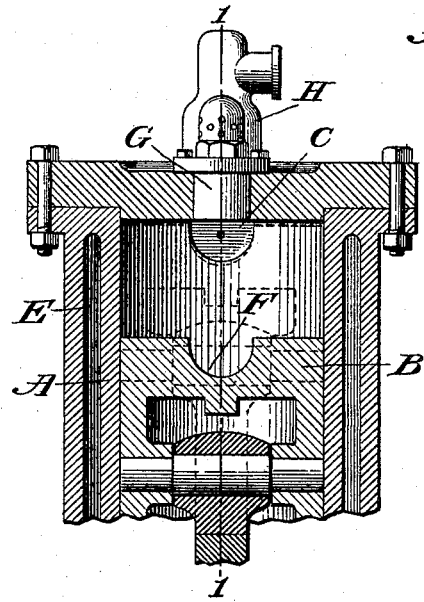
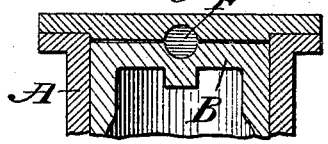
WITNESSES:
INVENTOR
Arthur J. Frith
BY
Wetmore & Jenner
ATTORNEYS

UNITED STATES PATENT OFFICE.

ARTHUR J. FRITH, OF NEW YORK, N. Y., ASSIGNOR TO THE DIESEL MOTOR COMPANY OF AMERICA, OF NEW YORK.

INTERNAL-COMBUSTION ENGINE.

SPECIFICATION forming part of Letters Patent No. 644,798, dated March 6, 1900.

Application filed October 23, 1899. Serial No. 734,479. (No model.)

*To all whom it may concern:*

Be it known that I, ARTHUR J. FRITH, a citizen of the United States, and a resident of the city of New York, county of New York, and State of New York, have invented certain new and useful Improvements in Internal-Combustion Engines, of which the following is a specification.

My invention relates to improvements in internal-combustion motors of the Diesel type. These engines work on a four-stroke cycle as follows: The combustion of fuel injected from the fuel-valve gives a pressure on the inward stroke of the piston. On the next outward stroke the waste gases or products of combustion are expelled from the cylinder. On the next inward stroke the cylinder fills with fresh air drawn in from the atmosphere. This air is compressed on the succeeding outward stroke to a temperature sufficient to ignite the fuel, which is now injected from the fuel-valve. Combustion of the mixture of air and fuel then ensues and the cycle recommences. For the successful operation of these engines it is essential that the temperature attained by the air in the cylinder during the period of compression on the fourth stroke of the cycle be high enough to cause ignition of the fuel when injected from the fuel-valve. It is also important that on the introduction of the fuel uniform and complete combustion shall take place as quickly as possible. Owing to the large amount of relatively-cooler metallic surface to which the air is exposed at this point and the proximity of the usual water-jacket the loss of heat between the time of compression and that of the admission of the fuel may become so great as to preclude a proper ignition. This may be compensated for by an excessive compression, but only at the expense of additional energy.

In the German engines it has been the practice to simply compress the air in the top of the cylinder, thus forming a cylindrical body of air exposed to the combined cooling effect of the entire cylinder end, the piston-face, and a strip around the cylinder equal in length to the circumference of the cylinder and in width to the distance between the cylinder-head and the piston-face at the outer limit of the stroke. As the strip last mentioned is usually backed by a water-jacket it is readily apparent that the construction gives a very large amount of cooling-surface per cubic inch of inclosed air. Now it is evident that if the metallic surface to which the air is exposed can be diminished the detrimental cooling effect will be considerably lessened; and the objects of my improvements are to provide a clearance-space in the cylinder of less surface area than has been hitherto employed and to afford facilities for the rapid introduction and ignition of the fuel. Other advantages will be apparent from the specification. I attain these objects by the mechanism illustrated in the accompanying drawings, in which—

Figure 1 represents a longitudinal section through the head end of an engine-cylinder passing through the axis of the admission-port, the section being taken on line 1 1 of Fig. 2, the crank end of the cylinder and adjacent parts of the engine being broken away. Fig. 2 is a longitudinal section at right angles to Fig. 1 on line 2 2 of Fig. 1. Figs. 3 and 4 show modifications, the scale being reduced.

Similar reference-letters indicate similar parts throughout the figures.

A is the cylinder, B the piston, C the admission-port, D the fuel-valve, E the water-jacket, G the safety-valve, H the air-admission valve, and K the escape-valve, of an engine of the Diesel type. In the ordinary engine a considerable clearance is left between the face of the piston and the internal face of the cylinder-head. In this engine I bring the piston-face at the outer limit of the stroke in substantial contact with the cylinder-head, (see dotted lines in Figs. 1 and 2,) so as to give practically no clearance at that point. I provide for air-space, however, by forming in the face of the piston a groove or channel F, preferably semiconical in shape, (see Fig. 1,) its axis in a plane passing through the axis of the admission-port, with the larger end of the cone nearest such port. When the piston is at the top of the stroke, this channel F alines with the port C, and the entire body of compressed air is concentrated in this temporarily-formed chamber or tunnel. As is apparent, a much less area of cooling-surface is exposed per unit of cubical contents of air than in the ordinary form of clearance-space.

The fuel emerges from the fuel-valve D in a spray or jet of more or less conical shape and is at once surrounded by compressed air of a temperature considerably above its ignition-point, its primary contact being with the very hottest portion of such air—namely, the central portion. Combustion immediately occurs and is uniform throughout the circumference of the cone. By reason of the long narrow shape of the clearance-space the particles of fuel mix more thoroughly and intimately with the air than in the older engines. The mixture of fuel and air is quickly projected across the piston, and the combustion is substantially simultaneous not only throughout the circumference of the cone, but also throughout the length thereof.

In the former engines where the fuel was introduced through a port in the head of the cylinder the jet struck against the face of the piston and was deflected toward the sides of the clearance-space before it could ignite. The objectionable feature of this method of introduction lay in the fact that the jet striking the comparatively-cold piston-face was apt to deposit carbon thereon with a corresponding loss of the originally-available energy. My improvement avoids this objection, for by its use the fuel has opportunity to move in a clear space entirely across the cylinder in the line of its entry before it can come in contact with any part of the metal cylinder or piston. The construction is therefore most perfectly adapted to prevent the deposition of carbon in any part of the ignition-space.

In actual use it is found impossible to exclude entirely the air from between the adjacent plane surfaces of the cylinder end and piston-face. Its amount is so small, however, as to exercise practically no harmful effect on the tendency of the fuel to ignite, since it bears but a small ratio to the large body of highly-heated air in the channel F, and it is immediately reheated by the great heat evolved in the initial stages of combustion. As a factor in results it can therefore be safely neglected.

In Figs. 3 and 4 are shown modifications. The channel may be located entirely within the cylinder-head or partly in the cylinder-head and partly in the piston, the two channels uniting to form one channel at the time of combustion of the charge. Fig. 3 shows an engine with a channel entirely in the cylinder-head, and Fig. 4 with the channel partly in the cylinder-head and partly in the piston.

I do not limit myself to a channel of a conical or semiconical shape, though that form I believe to be preferable, since it corresponds more nearly to the shape of the fuel-jet. Channels of a cylindrical, semicylindrical, polygonal, or other shape I consider within the scope of my invention. It is desirable to make the channel and admission-port of similar cross-section so far as possible. The depth of the channel may be varied to provide greater or less compression, as desired.

What I claim as my invention, and desire to secure by Letters Patent, is—

1. In an internal-combustion engine, the combination of a cylinder, a head on said cylinder, a piston in said cylinder, said piston and cylinder-head being so shaped with respect to each other as to form between them a channel to serve as a clearance-space and ignition-chamber, the longitudinal axis of said channel lying substantially at right angles to the longitudinal axis of the cylinder, substantially as described.

2. In an internal-combustion engine, the combination of a cylinder, a head on said cylinder, a piston in said cylinder, said piston and cylinder-head being so shaped with respect to each other as to form between them a channel, the longitudinal axis of said channel coinciding with the diameter of the cylinder, and lying substantially at right angles to the longitudinal axis of the cylinder, to serve as a clearance-space and ignition-chamber, substantially as described.

3. In an internal-combustion engine, the combination of a cylinder, a head on said cylinder having a plane inner face, a piston in said cylinder, having a plane face opposed to the plane face of the cylinder-head and a channel in the piston-face, the longitudinal axis of said channel coinciding with a diameter of the cylinder, and lying substantially at right angles to the longitudinal axis of the cylinder, to provide clearance between the piston and the cylinder-head, substantially as described.

4. In an internal-combustion engine, the combination of a cylinder, a head on said cylinder having a plane inner face, said cylinder provided near said head with a lateral admission-port, a piston in said cylinder, having a plane face opposed to the plane face of the cylinder-head and a channel in the piston-face to provide clearance, the longitudinal axis of the channel lying substantially at right angles to the longitudinal axis of the cylinder, and in a plane passing through the longitudinal axis of the cylinder and the axis of the admission-port, whereby at the outer limit of the stroke the channel and port aline, and provide a continuous chamber for the admission of the fuel charge, substantially as described.

In testimony whereof I have signed my name to this specification in the presence of two subscribing witnesses.

ARTHUR J. FRITH.

Witnesses:
G. A. TAYLOR,
THEODORE I. DORMAN.